Aug. 7, 1923.

E. L. KENYON

LIQUID LEVEL INDICATOR

Filed Aug. 23, 1921

E. L. Kenyon.
INVENTOR

BY Victor J. Evans
ATTORNEY

WITNESS:

Aug. 7, 1923.

E. L. KENYON

LIQUID LEVEL INDICATOR

Filed Aug. 23, 1921

E. L. Kenyon.
INVENTOR

Patented Aug. 7, 1923.

1,464,476

UNITED STATES PATENT OFFICE.

EDWARD L. KENYON, OF ARDMORE, OKLAHOMA.

LIQUID-LEVEL INDICATOR.

Application filed August 23, 1921. Serial No. 494,596.

*To all whom it may concern:*

Be it known that I, EDWARD L. KENYON, a citizen of the United States, residing at Ardmore, in the county of Carter and State of Oklahoma, have invented new and useful Improvements in Liquid-Level Indicators, of which the following is a specification.

This invention comprehends the provision of an indicator by means of which the level of gasolene or other fluid contained within a tank may be readily determined, the invention embodying amongst other features a resilient element which controls the movement of the pointer incident to the filling of the tank, while the movement of the pointer in a reverse direction is controlled by a float actuated means which is associated with the resilient element so that the latter is wound simultaneously with the movement of the pointer under the influence of the float actuated means.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views and wherein:—

Figure 1:
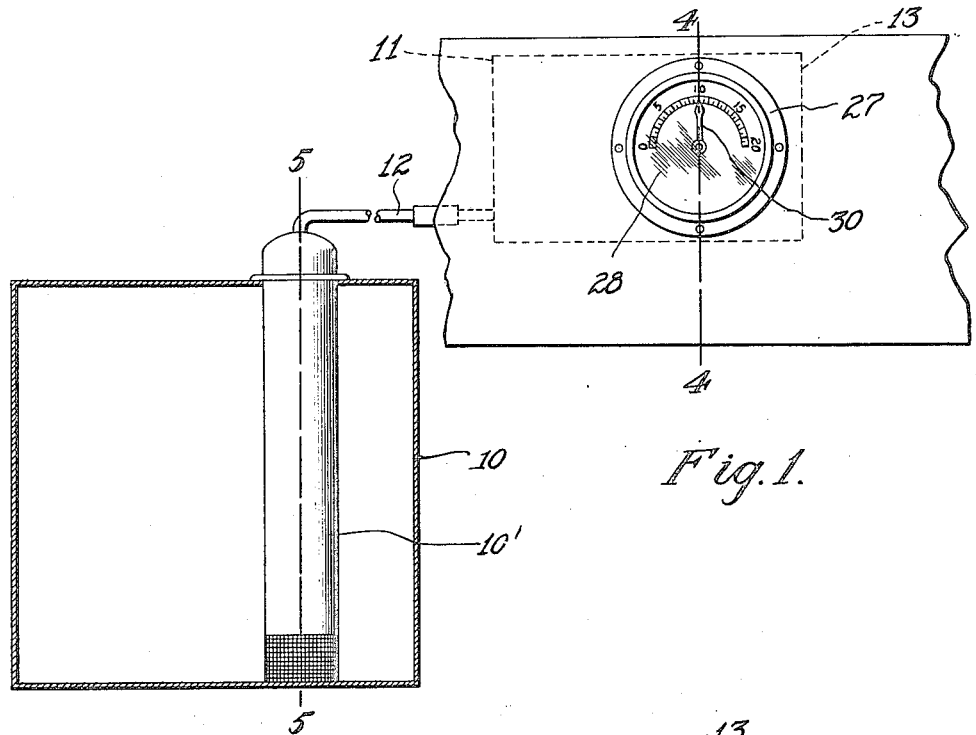
Figure 1 is a diagrammatic view, showing a fluid containing tank and the indicator associated therewith.
Figure 2:
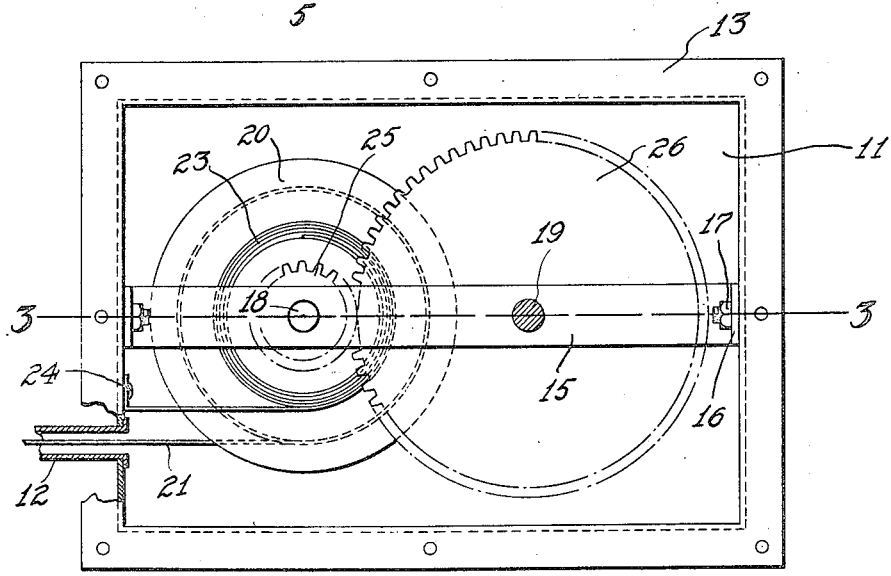
Figure 2 is an enlarged view, partly in section, of the indicator, with dial casing removed.
Figure 3:
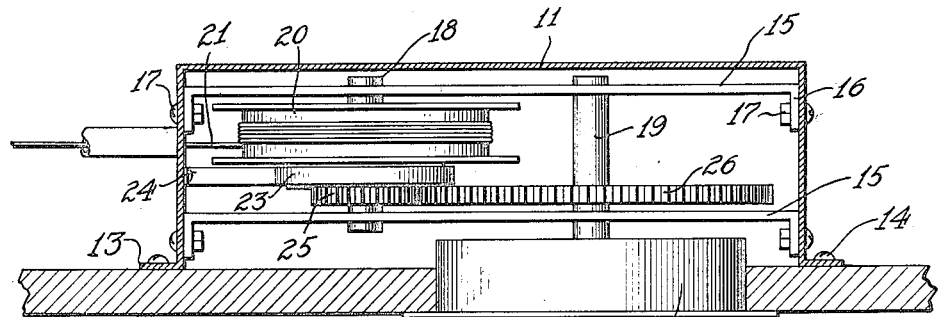
Figure 3 is a sectional view taken on line 3—3 of Figure 2.
Figure 4:
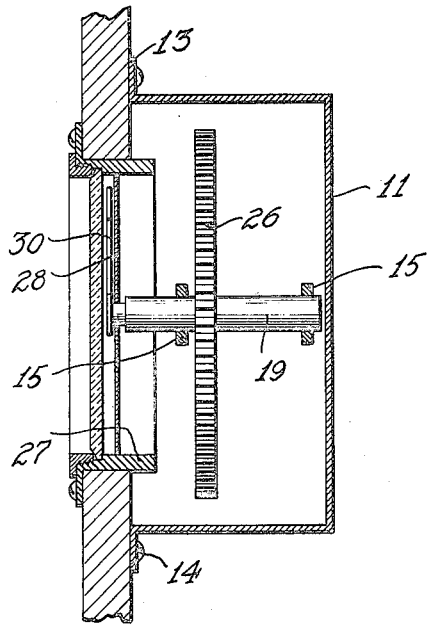
Figure 4 is a sectional view taken at right angles to Figure 3 and on line 4—4 of Figure 1.
Figure 6:
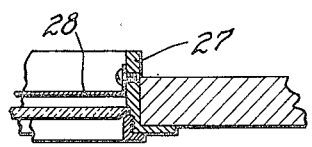
Figure 6 is a fragmentary section through the dial casing.
Figure 5:
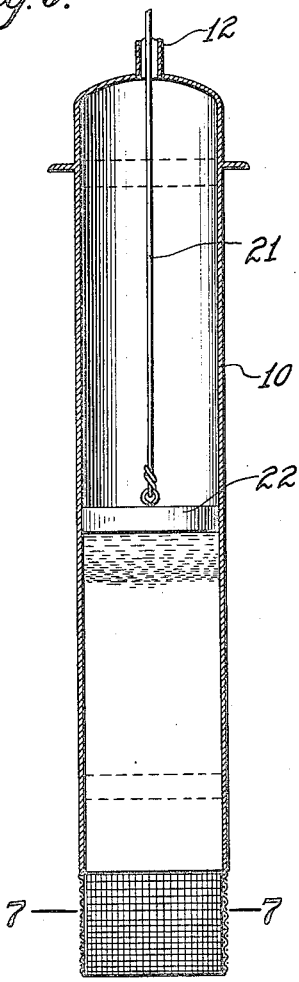
Figure 5 is a section on line 5—5 of Figure 1.
Figure 8:
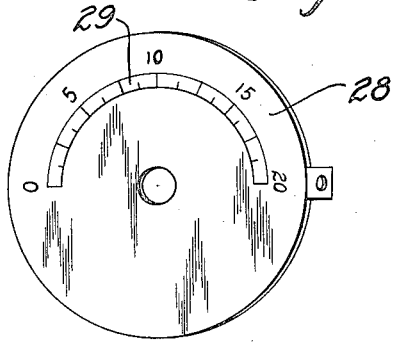
Figures 7, 8 and 9 are detail views.
Figure 9:
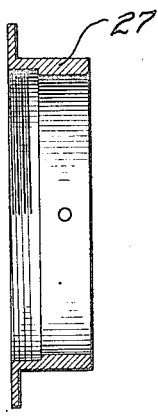
Figure 7:
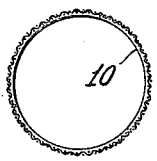

Referring to the drawings in detail, 10 indicates a fluid containing tank which may be of any suitable construction and may also vary in size. Arranged vertically within the tank is a cylinder 10', the latter being associated with the casing 11 by means of a suitable hollow coupling 12. The casing 11 is provided with an attaching flange 13 which surrounds the casing, so that the casing may be secured to the dash board of an automobile, or to any other suitable support by means of fastening elements 14.

Arranged within the casing 11 is a frame made up of spaced brackets formed of metallic strips 15, the terminals of which are offset as at 16 and adapted to be secured to the walls of the casing by means of fastening elements 17. Journaled between the frame members 15 are spaced shafts 18 and 19 respectively, the shaft 18 having fixed thereto a drum 20. One end of a flexible element 21 is secured to the drum, while the opposite end of this element supports a float 22 which operates within the tank 10. The flexible element is passed through the coupling 12 as illustrated and is adapted to be wound about and unwound from the drum 20 incident to the rise and fall of the float 22. A spring 23 is coiled about the shaft 18 and arranged at one side of the drum 20, this spring having one end fixed to the shaft 18 and its opposite end suitably secured to the casing 11 as at 24. The purpose of this spring will be hereinafter set forth. Fixed upon the shaft 18 is a small gear 25 which meshes with a relatively large gear 26, the latter being fixed upon the shaft 19, whereupon the rotation of the shaft 19 is controlled by the rotation of the shafts 18.

Arranged within the casing 11 which I term the gear casing, is a casing of cylindrical formation which I term the dial casing herein indicated at 27, the casing 27 supporting the dial 28 which is suitably graduated as at 29. The gear 26 is arranged within the casing 11, while the shaft 19 supporting the gear 26 projects beyond the casing through the dial 28 and supports a pointer 30 which cooperates with the graduations 29 to indicate the quantity of liquid within the tank 10.

In practice, when the contents of the tank 10 are consumed, causing the floats 22 to fall within the tank, the flexible element 21 is incidentally unwound from the drum 20 rotating the shaft 18 and imparting similar motion to the shaft 19 through the communication above described. In this instance, the shaft 19 is rotated in a direction to bring the pointer 30 to its normal position, or back to zero indicated on the dial 28. During this movement of the parts, the spring 23 is tensioned. Incident to the filling of the tank 10, and the consequent rise of the float 22, the flexible element 21 is slackened but wound about the drum 20. However, as the flexible element 21 is slackened, the spring 23 recoils. thereby reversing the direction in which the pointer 30 is moved, moving the pointer across the dial to indicate the amount of liquid contained in the tank 10. The construction is not only simple, but very positive and efficient in operation for the purpose intended.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

A liquid level indicator of the character described comprising a cylinder arranged within a liquid container tank, a gear casing in communication with the cylinder, a pair of spaced metallic strips secured to the inner walls of the casing, a pair of spaced shafts mounted for rotation between the strips, a drum carried by one shaft, a float arranged in said cylinder, a flexible element supporting said float and being adapted to operate with the drum, a relatively small gear mounted adjacent said drum and adapted to be rotated therewith, a relatively large gear carried by the other shaft and meshing with the small gear, a dial casing arranged adjacent one end of the gear casing and receiving one end of the last mentioned shaft, a graduated dial having the end of the last mentioned shaft projecting therethrough, a pointer supported by the projecting end and adapted to cooperate with the dial and a spring having one end rigidly secured to the opposite side of the gear casing and its opposite end coiled around the shaft carrying the drum.

In testimony whereof I affix my signature.

EDWARD L. KENYON.